United States Patent
Welle et al.

(10) Patent No.: US 11,022,339 B2
(45) Date of Patent: Jun. 1, 2021

(54) FLAMELESS HEATING SYSTEM

(71) Applicant: MAC, Inc., Bismarck, ND (US)

(72) Inventors: Travis G. Welle, Bismarck, ND (US); Mark R. Leingang, New Salem, ND (US)

(73) Assignee: MAC, Inc., Bismarck, ND (US)

( * ) Notice: Subject to any disclaimer, the term of this patent is extended or adjusted under 35 U.S.C. 154(b) by 0 days.

(21) Appl. No.: 16/554,354

(22) Filed: Aug. 28, 2019

(65) Prior Publication Data

US 2020/0049374 A1 Feb. 13, 2020

Related U.S. Application Data

(63) Continuation of application No. 15/726,231, filed on Oct. 5, 2017, now abandoned, which is a continuation
(Continued)

(51) Int. Cl.
*F24H 1/06* (2006.01)
*F24H 1/00* (2006.01)
(Continued)

(52) U.S. Cl.
CPC ........... *F24H 1/06* (2013.01); *B60H 1/00314* (2013.01); *B60H 1/038* (2013.01); *F24H 1/009* (2013.01);
(Continued)

(58) Field of Classification Search
CPC . B60H 1/20; B60H 1/22; B60H 1/038; B60H 1/00314; B60H 2001/146;
(Continued)

(56) References Cited

U.S. PATENT DOCUMENTS 1,200,745 A 10/1916 Marlot
1,211,636 A 1/1917 Spray
(Continued)

FOREIGN PATENT DOCUMENTS

CA 2730821 A1 8/2011
CA 2763994 A1 7/2012
(Continued)

OTHER PUBLICATIONS

"DE_19711682_A1_M—Mach Trans.pdf", machine translation, EPO.org, Oct. 6, 2014.*
(Continued)

*Primary Examiner* — Daniel E. Namay
(74) *Attorney, Agent, or Firm* — Merchant & Gould P.C.

(57) ABSTRACT

A mobile heating system includes an enclosure defining a plenum that houses a fan and an internal combustion engine. The heating system also includes a hydraulic circuit including a hydraulic pump operably coupled to the internal combustion engine and a first heat exchanger located in the plenum and in fluid communication with the hydraulic pump. The hydraulic circuit also includes a hydraulic motor operably coupled to the fan wherein the hydraulic motor is in fluid communication with and driven by the hydraulic pump. A first valve is disposed between the hydraulic pump and the heat exchanger and is configured to restrict fluid flow and to increase a fluid pumping pressure of the hydraulic pump. A second valve is located upstream of the first valve and is configured to selectively direct hydraulic fluid between the first valve and the hydraulic motor.

14 Claims, 8 Drawing Sheets

Related U.S. Application Data of application No. 14/951,021, filed on Nov. 24, 2015, now abandoned, which is a continuation of application No. 13/458,489, filed on Apr. 27, 2012, now Pat. No. 9,228,760.

(51) Int. Cl.
| | | |
|---|---|---|
| *B60H 1/03* | (2006.01) | |
| *B60H 1/00* | (2006.01) | |
| *F24H 3/08* | (2006.01) | |
| *F24H 1/08* | (2006.01) | |
| *F24H 9/20* | (2006.01) | |
| *B60H 1/14* | (2006.01) | |
| *F24V 40/10* | (2018.01) | |

(52) U.S. Cl.
CPC ............ *F24H 1/08* (2013.01); *F24H 3/08* (2013.01); *F24H 9/2064* (2013.01); *B60H 2001/146* (2013.01); *F24V 40/10* (2018.05)

(58) Field of Classification Search
CPC ..... F24C 9/00; F24H 1/06; F24H 1/08; F24H 1/009; F24H 3/08; F24H 9/2064; F24H 2240/06; F24J 3/003; F24J 3/006; Y02E 20/14
USPC ........ 237/12.1, 12.3 B, 34, 12.3 R; 126/247; 123/2; 290/1 A, 1 R; 60/911
See application file for complete search history.

(56) References Cited

U.S. PATENT DOCUMENTS

| | | | |
|---|---|---|---|
| 1,427,475 A | 8/1922 | Ishimatsu | |
| 2,410,353 A | 10/1946 | McCollum | |
| 3,227,152 A | 1/1966 | Weinhold | |
| 4,270,695 A | 6/1981 | Carson | |
| 4,384,673 A | 5/1983 | Carson | |
| 4,387,701 A | 6/1983 | Gibbons | |
| 4,524,582 A | 6/1985 | Lucas et al. | |
| 4,691,687 A | 9/1987 | Mutchler | |
| 4,721,028 A | 1/1988 | Lucas et al. | |
| 4,756,359 A | 7/1988 | Greer | |
| 4,896,830 A | 1/1990 | Takamatsu | |
| 4,996,845 A | 3/1991 | Kim | |
| 5,031,690 A * | 7/1991 | Anderson | B64F 1/364 165/43 |
| 5,240,403 A * | 8/1993 | McAnespie | F23G 7/068 110/190 |
| 5,333,679 A * | 8/1994 | Suzuki | B60H 1/22 165/43 |
| 5,617,504 A | 4/1997 | Sciacca et al. | |
| 5,755,379 A | 5/1998 | Ito | |
| 5,778,843 A | 7/1998 | Inoue et al. | |
| 5,829,675 A | 11/1998 | Ban | |
| 5,836,270 A | 11/1998 | Aoki et al. | |
| 5,899,183 A | 5/1999 | Aoki et al. | |
| 5,954,266 A | 9/1999 | Hoshino et al. | |
| 6,016,967 A | 1/2000 | Takechi et al. | |
| 6,079,629 A | 6/2000 | Morikawa et al. | |
| 6,186,138 B1 * | 2/2001 | Hybertson | F24D 3/16 126/247 |
| 6,244,232 B1 | 6/2001 | Ban et al. | |
| 6,290,473 B1 * | 9/2001 | Thome | F15B 21/0423 417/372 |
| 6,345,495 B1 * | 2/2002 | Cummings | F23D 14/66 60/39.465 |
| 6,415,866 B1 | 7/2002 | Baugh | |
| 6,427,639 B1 * | 8/2002 | Andrews | F01N 3/2006 123/3 |
| 6,448,535 B1 | 9/2002 | Ap | |
| 6,691,925 B2 * | 2/2004 | Roberts | B60H 1/14 122/26 |
| 6,772,829 B2 * | 8/2004 | Lebrun | F28D 1/024 165/121 |
| 6,775,981 B2 | 8/2004 | Fukuda et al. | |
| 6,779,737 B2 * | 8/2004 | Murray | B60H 1/00314 237/12.3 R |
| 7,207,389 B2 * | 4/2007 | Foster | E21B 19/22 166/302 |
| 7,293,606 B2 * | 11/2007 | Benoit | F23D 14/18 165/171 |
| 7,420,144 B2 * | 9/2008 | Lunneborg | H02K 49/108 219/628 |
| 7,424,916 B2 * | 9/2008 | Foster | E21B 37/00 166/303 |
| 7,573,009 B2 * | 8/2009 | Lunneborg | H05B 6/108 219/628 |
| 7,637,232 B2 * | 12/2009 | Foster | F22B 1/1807 122/26 |
| 7,766,077 B2 * | 8/2010 | Masters | F24D 17/00 165/200 |
| 7,861,537 B2 | 1/2011 | Givens | |
| 7,959,814 B2 * | 6/2011 | Masters | F24D 17/00 210/781 |
| 8,302,876 B2 | 11/2012 | Sanger et al. | |
| 8,480,006 B2 | 7/2013 | Sanger et al. | |
| 8,581,148 B2 | 11/2013 | Kilts | |
| 8,899,627 B2 | 12/2014 | Krause et al. | |
| 9,157,634 B2 | 10/2015 | Mencel et al. | |
| 9,228,760 B2 * | 1/2016 | Welle | F24H 3/08 |
| 9,366,170 B2 | 6/2016 | Koopmann et al. | |
| 9,655,263 B2 | 5/2017 | Bohlender et al. | |
| 10,145,586 B2 | 12/2018 | Mencel et al. | |
| 2002/0029570 A1 | 3/2002 | Baeuerle et al. | |
| 2002/0153127 A1 | 10/2002 | Togawa et al. | |
| 2003/0006032 A1 | 1/2003 | Nakagawa et al. | |
| 2003/0030281 A1 * | 2/2003 | Campion | H02P 9/04 290/1 R |
| 2004/0098966 A1 | 5/2004 | Dewis | |
| 2004/0200610 A1 * | 10/2004 | Hara | B60H 1/00921 165/202 |
| 2005/0205682 A1 | 9/2005 | Sanger et al. | |
| 2005/0205683 A1 * | 9/2005 | Schmitt | F01P 7/165 237/12 |
| 2006/0037352 A1 | 2/2006 | Cho et al. | |
| 2006/0123818 A1 | 6/2006 | Kim et al. | |
| 2006/0185369 A1 | 8/2006 | Ahmed et al. | |
| 2006/0231640 A1 | 10/2006 | Hashimura et al. | |
| 2007/0204962 A1 * | 9/2007 | Hauser | F22B 1/1807 159/4.01 |
| 2008/0060375 A1 | 3/2008 | Sanger et al. | |
| 2009/0008464 A1 | 1/2009 | Gerhardt et al. | |
| 2009/0071428 A1 | 3/2009 | Kamiyama et al. | |
| 2009/0112368 A1 * | 4/2009 | Mann, III | B64F 1/34 700/275 |
| 2009/0263259 A1 | 10/2009 | Picton et al. | |
| 2010/0089340 A1 | 4/2010 | Givens | |
| 2010/0192875 A1 * | 8/2010 | Frick | F22B 1/16 122/26 |
| 2010/0194111 A1 | 8/2010 | Van Den Bossche et al. | |
| 2010/0224689 A1 | 9/2010 | Waninger et al. | |
| 2011/0048671 A1 | 3/2011 | Nishikawa et al. | |
| 2011/0132292 A1 | 6/2011 | Schwartz et al. | |
| 2011/0185713 A1 | 8/2011 | Koopmann et al. | |
| 2011/0187123 A1 | 8/2011 | Hamm et al. | |
| 2011/0204651 A1 | 8/2011 | Nishimura et al. | |
| 2011/0214423 A1 | 9/2011 | Givens | |
| 2012/0163781 A1 | 6/2012 | Sedlacek et al. | |
| 2012/0180778 A1 | 7/2012 | Krause et al. | |
| 2013/0052595 A1 | 2/2013 | Mencel et al. | |
| 2013/0199178 A1 | 8/2013 | Kanou et al. | |
| 2013/0284817 A1 * | 10/2013 | Welle | B60H 1/00314 237/12.1 |
| 2014/0209045 A1 | 7/2014 | Hibi et al. | |
| 2014/0216437 A1 * | 8/2014 | Martian | F24H 1/08 126/271.2 R |
| 2014/0319125 A1 | 10/2014 | Bohlender et al. | |
| 2016/0023770 A1 | 1/2016 | Thompson et al. | |

(56) References Cited

U.S. PATENT DOCUMENTS

2016/0209081 A1 7/2016 Mencel et al.
2016/0334132 A1* 11/2016 Welle .................. F24H 1/08
2017/0246764 A1 8/2017 Fox et al.

FOREIGN PATENT DOCUMENTS

| CA | 2788033 A1 | 2/2013 | |
| CA | 2918126 A1 | 7/2016 | |
| CA | 2899388 A1 | 2/2017 | |
| DE | 32 32 452 A1 | 3/1984 | |
| DE | 3725271 A1 * | 2/1989 | B60H 1/03 |
| DE | 3725271 A1 | 2/1989 | |
| DE | 197 11 682 A1 | 11/1997 | |
| DE | 197 43 012 A1 | 4/1998 | |
| DE | 101 55 210 A1 | 5/2003 | |
| EP | 0 034 242 A1 | 8/1981 | |
| EP | 0 543 606 A1 | 5/1993 | |
| WO | 97/13103 | 4/1997 | |
| WO | 2016044738 A1 | 3/2016 | |

OTHER PUBLICATIONS

Therm Dynamics, Inc., "Meet the Fleet," http://thermdynamics.com/fleet, retrieved Feb. 24, 2012.
MagTec Energy, "MagTec Energy XE 500," http://www.youtube.com/watch?v=CyNfiRJcI5M, Aug. 24, 2009.
Leader Energy Services Ltd., "Flameless Nitrogen Pumper," http://www.leaderenergy.com/_pdfs/resource-library/FlamelessNitrogenPumper.pdf, retrieved on or about Feb. 24, 2012.
Raibert, Marc, "BigDog, the Rough-Terrain Quadruped Robot," IFAC, 2008, pp. 10822-10825.
Rotational Energy, "Our Competitive Advantages," http://www.rotational-energy.com/AboutUs.html, retrieved on or about Feb. 24, 2012.
International Search Report and Written Opinion for PCT/US2013/038234 dated Sep. 12, 2013.
DE_19711682_A1_M—Mach Trans.pdf; Machine Translation for DE-197711682; http//www.epo.org; Oct. 6, 2014.

* cited by examiner

FLAMELESS HEATING SYSTEM

CROSS REFERENCE TO RELATED APPLICATION

This application is a Continuation of U.S. patent application Ser. No. 15/726,231, filed on Oct. 5, 2017; which is a Continuation of U.S. patent application Ser. No. 14/951,021, filed on Nov. 24, 2015, now abandoned; which is a Continuation of U.S. patent application Ser. No. 13/458,489, U.S. Pat. No. 9,228,760, issued on Jan. 5, 2016, entitled FLAMELESS HEATING SYSTEM, the disclosures of which are hereby incorporated by reference in their entireties.

BACKGROUND

Industrial heaters are used in a wide variety of situations, including outdoor construction, oil drilling, airports, unheated buildings, etc. Most industrial heaters utilize an internal combustion engine along with a combustion-type generator or burner which uses a flame to produce heat. However, in some instances, such as oil wells, a flame cannot be used to produce the heat due to safety concerns. In such instances, flameless heaters have been developed. However, improvements in flameless heater technology are desired, particularly with regard to efficiency.

SUMMARY

A mobile heating system is disclosed. In one embodiment, the system includes an enclosure supported by a mobile chassis wherein the enclosure defines an air plenum having an air inlet and an air outlet. The system also includes a fan disposed in the air plenum wherein the fan is configured to move an air flow stream from the air inlet to the air outlet of the enclosure. An internal combustion engine is also disposed in the air plenum. The heating system also includes a hydraulic circuit including a hydraulic pump operably coupled to the output shaft of the internal combustion engine, and a first heat exchanger located in the enclosure air plenum and in fluid communication with the hydraulic pump. The first heat exchanger is configured to transfer heat from fluid in the hydraulic circuit to the air flow stream. The hydraulic circuit also includes a hydraulic motor operably coupled to the fan wherein the hydraulic motor is in fluid communication with and driven by the hydraulic pump. A first valve is disposed between the hydraulic pump and the heat exchanger and is configured to restrict fluid flow and to increase a fluid pumping pressure of the hydraulic pump. A second valve is located upstream of the first valve and is configured to selectively direct hydraulic fluid between the first valve and the hydraulic motor. In one embodiment, the system further includes a control system configured to operate the second valve to maintain a temperature set point of the air flow stream.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
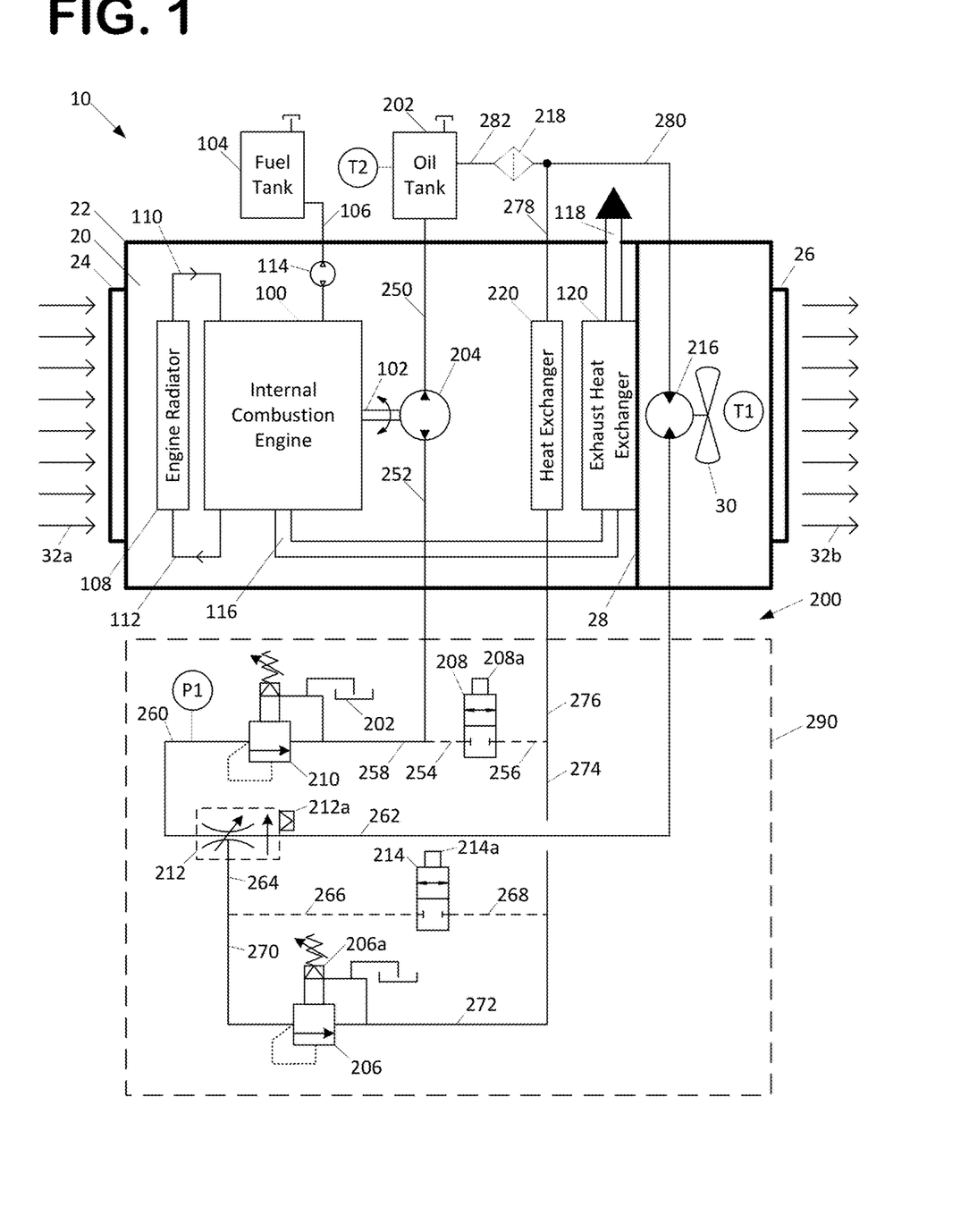
FIG. 1 is a schematic view of a flameless heating system having features that are examples of aspects in accordance with the principles of the present disclosure.
Figure 13:
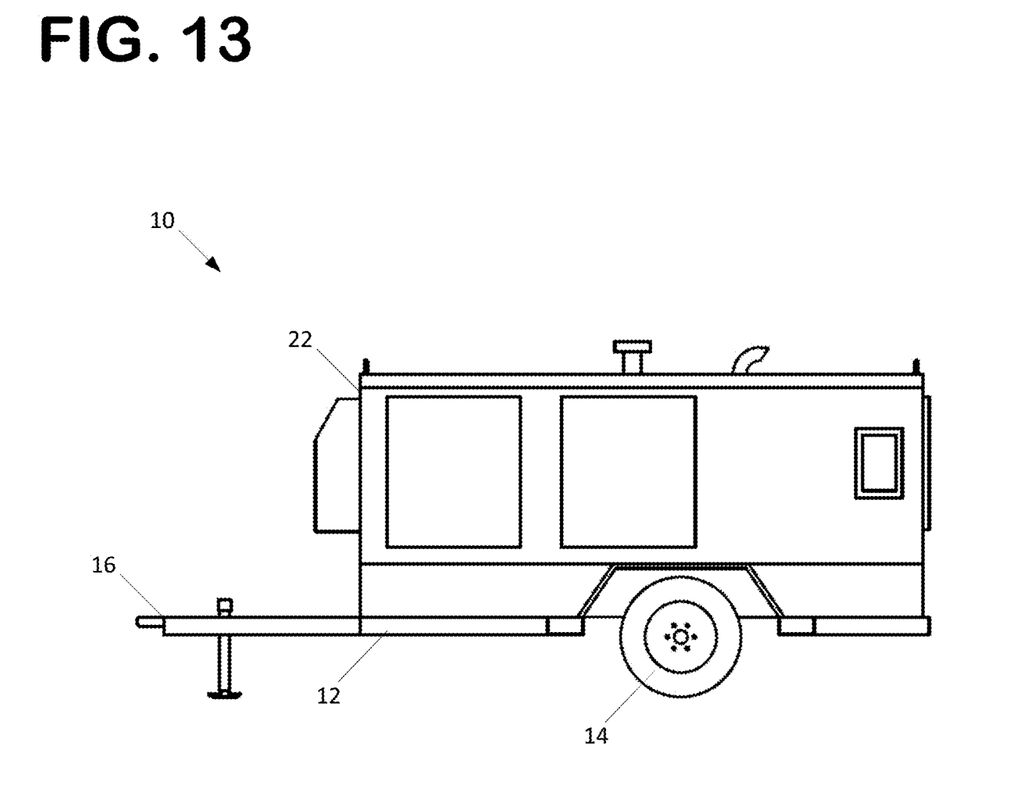
FIG. 13 is a side view of an exemplary physical embodiment of the flameless heating system shown in FIG. 1.

Referring to FIG. 1, a flameless heating system 10 is shown. Flameless heating system 10 is for heating an airflow stream 32. As shown, flameless heating system 10 has an interior plenum 20 defined by a housing 22. At one end of the housing 22, an ambient air intake 24 is provided for receiving an ambient airflow stream 32a. At another end of the housing 22, a heated air outlet 26 is provided for discharging the heated airflow stream 32b. Referring to FIG. 13, flameless heating system 10 includes a chassis 12 to which wheels 14 are rotatably mounted. Flameless heating system 10 may also include a hitch 16 such that the system 10 may be towed by a vehicle. Alternatively, flameless heating system 10 may be skid mounted or mounted onto or within a vehicle. Accordingly, flameless heating system 10 is a mobile heating system.

A fan 30 is also provided to move air from the intake 24, through the plenum 20, and out of the outlet 26. In one embodiment, the fan 30 is configured to provide up to 1,200 cubic feet per minute (cfm) of air flow at 5 inches total static pressure. However, it should be appreciated that fan 30 can be configured with a higher or lower airflow capacity depending upon application and arrangement. A bulkhead 28 may also be provided to ensure air flowing through the plenum 20 is sufficiently drawn through and/or across the internal components responsible for heating the airflow stream 32a. As shown, a temperature sensor T1 is provided downstream of fan 30 near the outlet 26 for measuring the temperature of the heated airflow stream 32b.

Within the housing, an internal combustion engine 100 is provided. As shown, internal combustion engine 100 has an output shaft 102 for driving a hydraulic pump 204, discussed later. In one embodiment, the internal combustion engine 100 is configured to provide an output capacity of 25 horsepower at 2,500 revolutions per minute (rpm). In one embodiment, the internal combustion engine is a water-cooled diesel engine with a displacement of 1.5 liters. However, internal combustion engine 100 can also be provided with other output capacities, as desired. It is noted that internal combustion engine could be configured to burn other fuels, such as gasoline and ethanol. When the internal combustion engine 100 is operating, radiation from the surface of the engine 100 provides heating to the plenum 20. In one embodiment, operation of the internal combustion engine 100 results in heat radiation to the plenum 20 of about 18,000 British Thermal Units per hour (BTU/hour).

A fuel tank 104, a fuel line 106, and a fuel pump 114 are also provided for delivering fuel to the internal combustion engine 100. In one embodiment, the fuel pump 114 is configured to deliver about 1.8 gallons per hour (gph) to the internal combustion engine 100.

In one embodiment, the internal combustion engine 100 is cooled by a radiator or heat exchanger 108 via coolant lines 110 and 112. As shown, the radiator 108 is arranged within plenum 20 such that the radiator 108 may be used to heat the airflow stream 32. In one embodiment, the temperature of the incoming coolant line is about 180 degrees F. while the temperature of the outgoing coolant line 110 is about 170 degrees F. at a coolant flow rate of about 14 gallons per minute. In such an embodiment, approximately 64,000 BTU/hour of heat can be transferred to the plenum 20 from the radiator 108.

Figure 10:
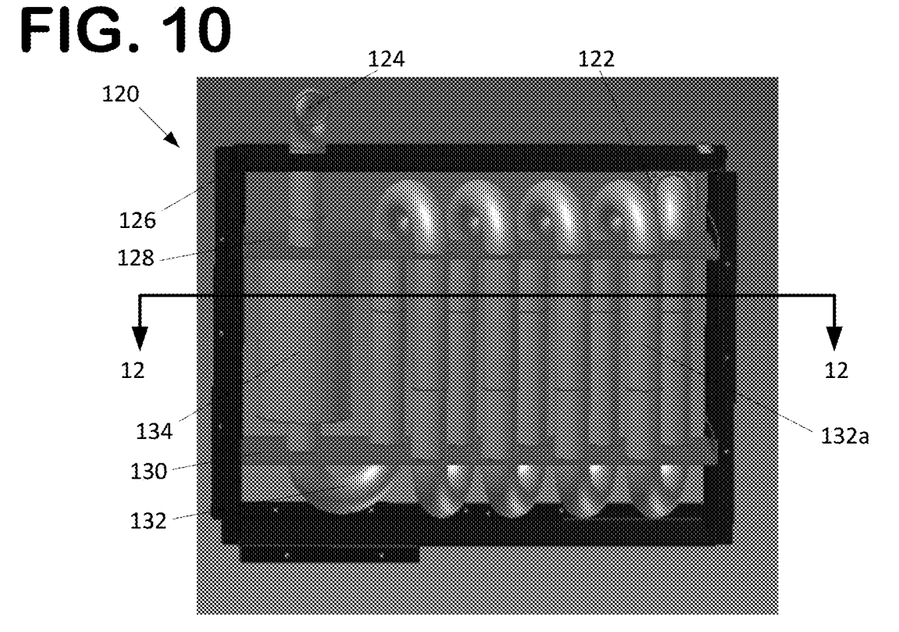
FIG. 10 is a front perspective view of an exhaust heat exchanger usable with the flameless heater of FIG. 1.
Figure 11:
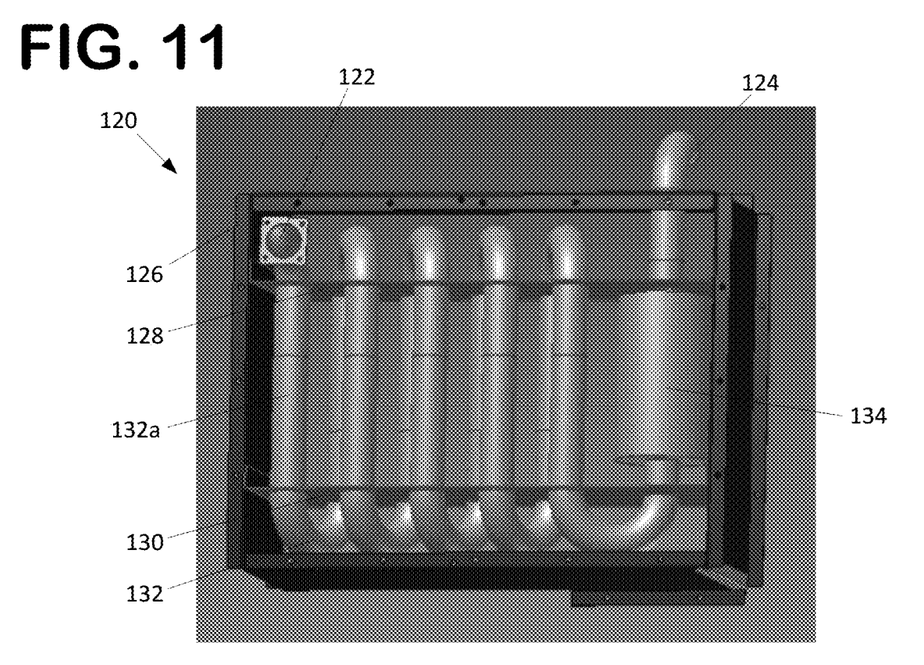
FIG. 11 is a rear perspective view of the exhaust heat exchanger shown in FIG. 10

The combustion exhaust from the engine 100 is connected to a heat exchanger 120 via piping 116, both of which are disposed in the plenum 20 such that they may heat the airflow stream 32. After flowing through the heat exchanger 120, the exhaust is routed to atmosphere via exhaust pipe 118. Referring to FIGS. 10 and 11, an exemplary physical arrangement of a heat exchanger 120 is shown. In the embodiment shown, heat exchanger 120 includes an inlet 122 for receiving exhaust from pipe 116 and an outlet 124 for discharging exhaust to pipe 118. In one embodiment, an additional exhaust pipe 118 is not utilized and outlet 124 serves as the final discharge point for exhaust to the atmosphere. Between the inlet 122 and the outlet 124 is tubing 132 that is exposed to the airflow stream 32. As shown, the tubing 132 has a nominal diameter of about 2 inches and a length of about 15 feet. In the embodiment shown, tubing 132 is provided in a single pass serpentine arrangement with four complete loops such that the length of the tubing 132 can be extended for greater heat transfer capacity.

Figure 12:
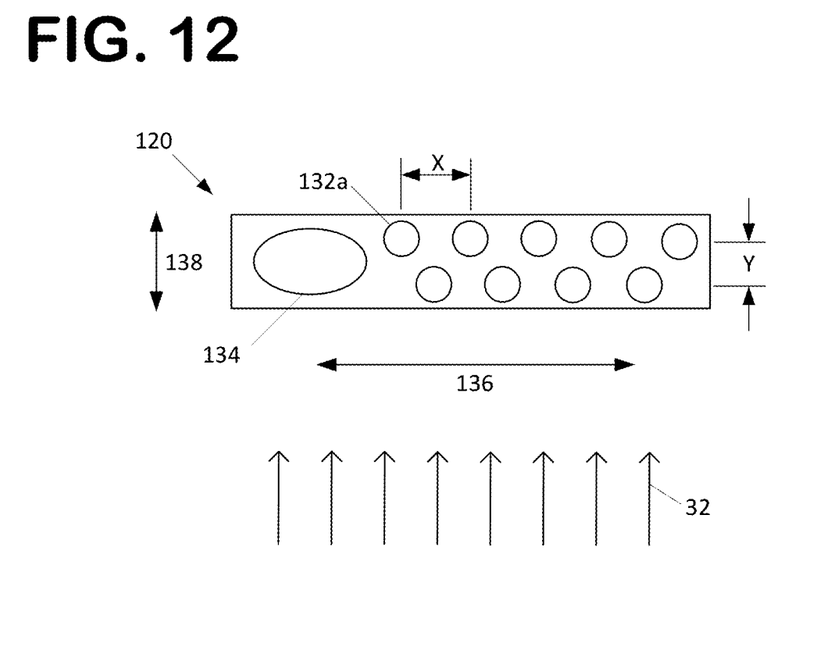
FIG. 12 is a schematic cross-section of the exhaust heat exchanger shown in FIG. 10 taken along the line 12-12.

As most easily seen at FIG. 12, tubing 132 has nine straight tube sections 132a, each of which is offset from an adjacent section 132a by a distance X in a first direction 136 and by a distance Y in a second direction 138. In one embodiment distance X is about 6 inches and distance Y is about 5 inches. This configuration allows for a compact heat exchanger in which each straight tube section 132a is directly exposed to the airflow stream 32 without interference from the adjacent straight tube sections 132a. This feature is also beneficial for improving heat transfer. It is noted that more or fewer loops and corresponding straight sections may be utilized depending upon application and desired heat transfer characteristics. Additionally, the offset distances X and Y may be similarly adjusted.

Between the tubing 132 and the outlet 124 is an engine muffler 134 for attenuating the sound output of the flameless heating system 10. As the muffler 134 is also exposed to the airflow stream 32, additional heat transfer is made possible. As shown, the tubing 132 and the muffler 134 are supported by a frame 126, a first support 128 and a second support 130. As configured, the disclosed exhaust heat exchanger 120 can transfer approximately 26,000 BTU/hour to airflow stream 32 flowing at approximately 1,200 cubic feet per minute when the exhaust temperature is about 1000 degrees F.

Referring back to FIG. 1, the flameless heating system 10 further includes a hydraulic system 200. Hydraulic system 200 is for converting the rotational energy provided by the internal combustion engine 100 to thermal energy that can be used to increase the temperature of the airflow stream 32 through the use of a hydraulic fluid. One example of a hydraulic fluid usable in hydraulic system 200 is hydraulic transmission fluid (HTF).

The primary components of the hydraulic system 200 are a pump 204, a heat exchanger 220, a hydraulic motor 216, and a hydraulic fluid storage tank 202. A number of valves are also provided in hydraulic system 200 for selectively heating and/or distributing the hydraulic fluid among the primary components. In one embodiment, the valves are provided in a manifold 290. Each of these features of the hydraulic system is discussed in further detail below.

As shown, hydraulic system 200 includes a hydraulic pump 204 mechanically coupled to and driven by the output shaft 102 of the internal combustion engine 100. In one embodiment, the pump 204 is directly connected to the output shaft 102. In one embodiment, the pump 204 is coupled to the output shaft 102 with a belt, gears, or spline output shaft. In one embodiment, the hydraulic pump 204 is an axial piston pump which may have a variable or fixed displacement. Other types of pumps may be used. In one embodiment, the internal combustion engine 100 and the hydraulic pump 204 are configured to provide a flow rate of about 28 gallons per minute of hydraulic fluid. However, it should be understood that pump 204 can be configured to provide any desired flow amount.

In the embodiment shown, the hydraulic pump 204 is configured to perform two primary functions. A first function of the hydraulic pump 204 is to deliver hydraulic fluid to the heat exchanger 220 and to the hydraulic motor 216. A second function of the hydraulic pump 204 is to heat the hydraulic fluid by imparting kinetic energy into the fluid. A first valve 206, discussed in more detail later, is located downstream of the pump 204 to provide resistance to the hydraulic pump 204 for this purpose. The corresponding pressure drop through the first valve 206 results in the primary heating of the hydraulic fluid as it passes through the valve 206.

As shown, the inlet of the pump 204 is connected to the storage tank 202 via a branch line 250. The storage tank 202 is oriented (e.g. elevated above the pump) to ensure that the pump 204 has sufficient head pressure sufficient to avoid pump cavitation and also adds volume to the system which helps to reduce the concentration of potential contaminants in the hydraulic fluid. In the embodiment shown, a temperature sensor T2 is provided in the storage tank 202 to sense the stored hydraulic fluid.

The discharge side of the pump 204 is most directly in fluid communication with a second valve 208 (via branches 252, 254) and with a third valve 210 (via branches 252, 258).

As shown, the second valve 208 is a two-way control valve with an actuator 208a to operate the valve between an open position and a closed position. In one embodiment, the second valve 208 is an electro-hydraulic, proportional, in-line type, pressure compensated, hydraulic flow control valve. It is noted that second valve 208 is optional to the flameless heating system 10, and in some embodiments it is preferred to configure the system 10 without valve 208 and branch lines 254, 256.

When in the open position, the second valve 208 allows the flameless heating system 10 to be placed in a warm-up mode. In the warm-up mode hydraulic fluid is heated with minimal loading the engine via a warm-up flow path (branches 256, 276) to the heat exchanger 220 that bypasses the first valve 206. This operation is beneficial during engine warm-up where premature loading of the engine may be harmful. Once the engine system and hydraulic fluid have been warmed sufficiently, the second valve 208 can be moved to the closed position thereby forcing hydraulic fluid into branch 258 and eventually to the first valve 206.

When the second valve 208 is in the closed position, the third valve 210 operates to protect the system from over-pressurization. In the embodiment shown, the third valve 210 is a pressure relief type valve. As configured, the third valve 210 is a fail-safe component that functions to bleed off excess pressure back to the tank 202, thereby eliminating harm to the hydraulic system 200 and its components. For example, the third valve 210 can have a setting of 1,750 psi to ensure the hydraulic fluid pressure, at the location of the third valve 210, never exceeds this value.

A fourth valve 212 is provided downstream of the third valve 210 via branch line 260. The fourth valve 212 is for selectively providing fluid to the first valve 206 and/or to the hydraulic motor 216. In the embodiment shown, the fourth valve 212 is a bypass-type flow control valve having an actuator 212a that can selectively deliver fluid between branches 262 and 264. Branch 262 leads directly to the hydraulic motor 216 while branch 264 leads to the first valve 206 via branch 270 and to a fifth valve via branch 266. A pressure sensor is provided in branch line 260 to measure the hydraulic fluid pressure between the fourth valve 212 and the third valve 210.

The hydraulic motor 216 is mechanically coupled to fan 30, and preferably located in the plenum 20 downstream of the heat exchangers 108, 220, and 120. However, hydraulic motor 216 and fan 30 may be located in a different portion of the plenum 20. Hydraulic motor 216 may also be located entirely outside of the airflow stream 32 as well. Hydraulic motor 216 may be directly coupled to the fan 30 or may be coupled to the fan 30 via belts or gears. Hydraulic fluid leaving the motor 216 is filtered via filter 218 and returned to the storage tank via branches 280 and 282. It is noted that the hydraulic motor 216 further heats the hydraulic fluid as the pressure in the fluid is decreased by the hydraulic motor 216. In one embodiment, the hydraulic motor 216 is configured to operate with a flow of about 4 to about 6 gallons per minute (gpm), for example about 5 gpm. However, it is noted that hydraulic motor 216 could be configured to operate at any desired flow rate.

The fifth valve 214 is placed in a parallel arrangement with the first valve 206 such that hydraulic fluid may be bypassed around the first valve 206 while still allowing for hydraulic fluid to flow to the hydraulic motor 216. As shown, the fifth valve 214 is a two-way control valve having an actuator 214a to operate the valve between an open position and a closed position. In one embodiment, the fifth valve 214 is an electro-hydraulic, proportional, in-line type, pressure compensated, hydraulic flow control valve.

As configured, the fifth valve 214 is in a normally closed state during regular operation of the flameless heating system 10 such that hydraulic fluid must pass through the first valve 206. When heating is no longer desired, the fifth valve 214 may be opened to place the system in a cool-down mode wherein hydraulic fluid is allowed to bypass the first valve 206 and unload the pump 204. Accordingly, with the fifth valve 214 in the open position, hydraulic fluid can flow directly to the heat exchanger 220 (via branches 268, 274, 276) without being heated by the first valve 206. Because the hydraulic motor 216 still receives hydraulic fluid when the fifth valve 214 is open (assuming the second valve 208 is closed), the temperature of the hydraulic fluid can be quickly dissipated as it passes through the heat exchanger 220 with the fan 30 operating. It is noted that the fifth valve 214 is optional to the flameless heating system 10, and in some embodiments it is preferred to configure the system 10 without valve 214 and branch lines 256, 268.

When both the second valve 208 and the fifth valve 214 are both closed, the hydraulic fluid will flow through the first valve 206. In the embodiment shown, the first valve 206 is a pressure relief type valve or a regulator type valve having an actuator 206a. As shown, the fifth valve is controllable to selectively reduce the pressure of the hydraulic fluid such that a desired output is achieved. As the hydraulic fluid passes through the first valve 206 and the pressure of the fluid is reduced, for example from 1,500 psi down to 100 psi, the hydraulic fluid temperature is further increased. After passing through the first valve 206, the hydraulic fluid is delivered to the heat exchanger 220 via branches 272, 274, and 276. The heat exchanger 220 is located in the plenum 20 downstream of the internal combustion engine and upstream of the engine exhaust heat exchanger. In one embodiment, the heat exchanger 220 is a bar and plate heat exchanger. Hydraulic fluid leaving the heat exchanger 220 is returned to the storage tank 202 and filtered via branch lines 278 and 282 and filter 218, respectively.

Figure 3:
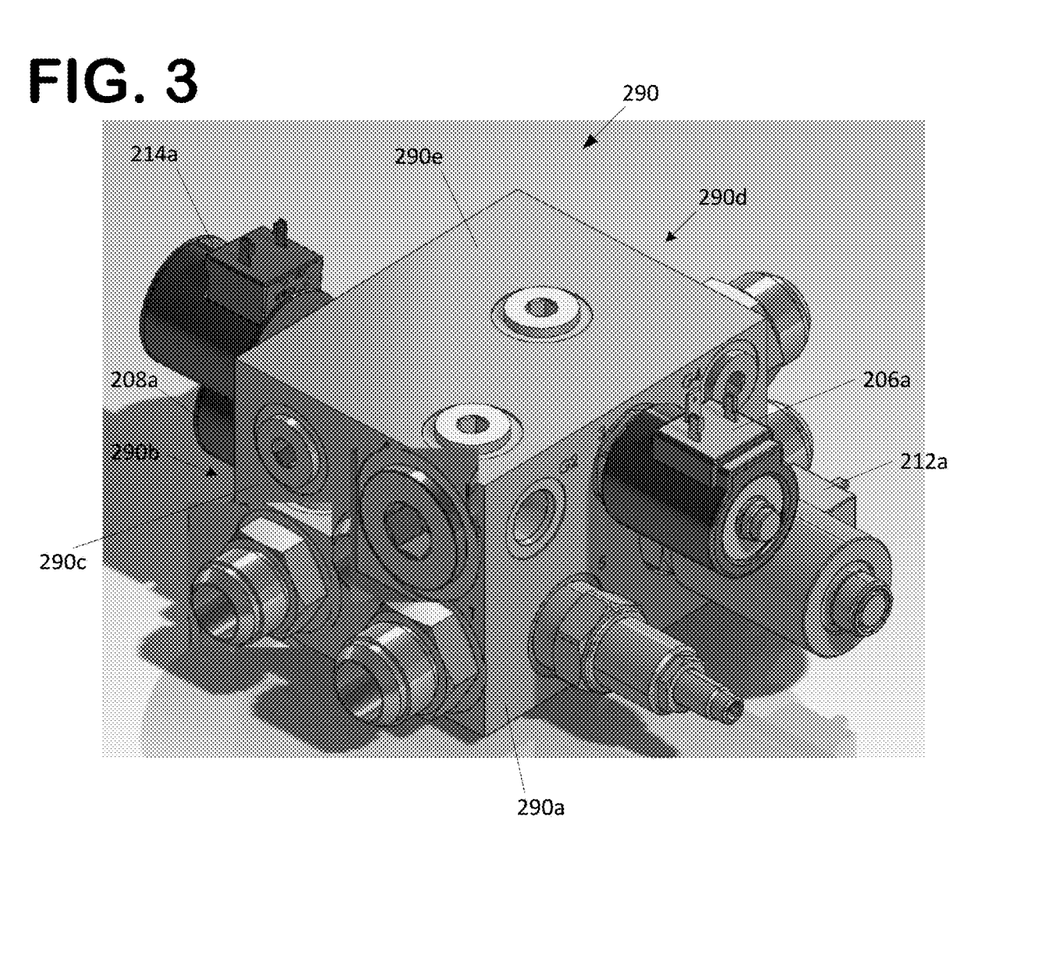
FIG. 3 is a perspective view of a hydraulic manifold usable with the flameless heating system shown in FIG. 1.
Figure 3A:
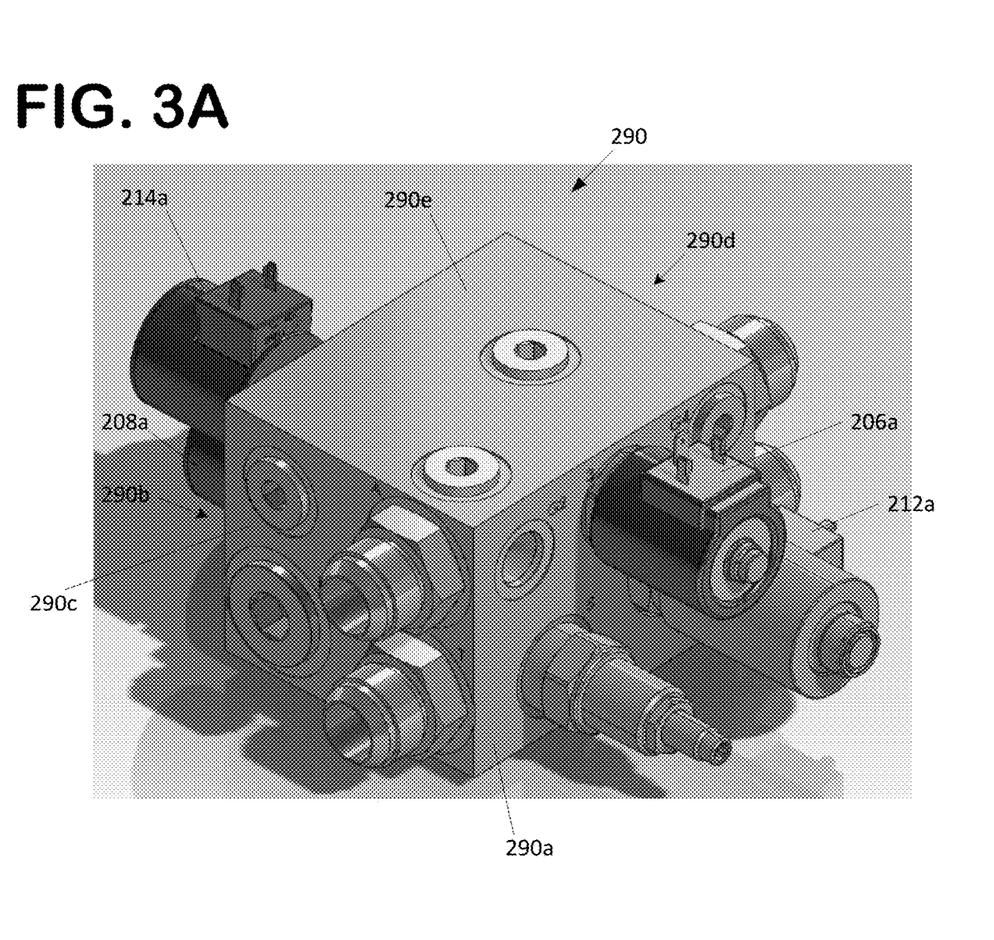
FIG. 3A is a perspective view of the hydraulic manifold of FIG. 3 with an altered porting arrangement.
Figure 4:
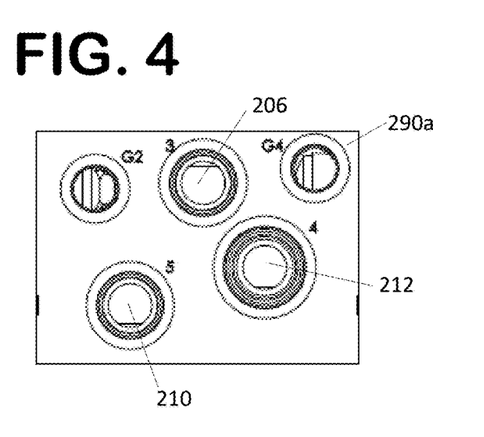
FIG. 4 is a first side view of the hydraulic manifold shown in FIG. 3.
Figure 5:
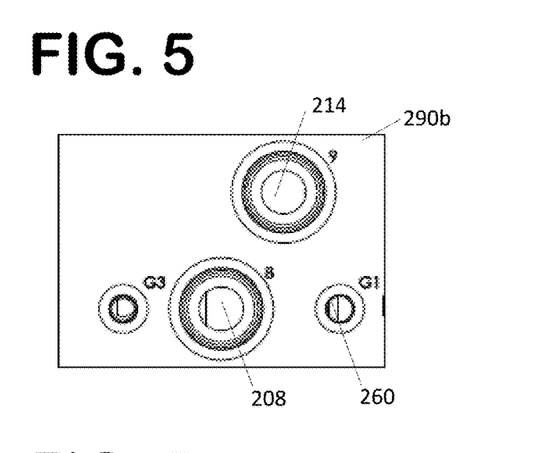
FIG. 5 is a second side view of the hydraulic manifold shown in FIG. 3.
Figure 6:
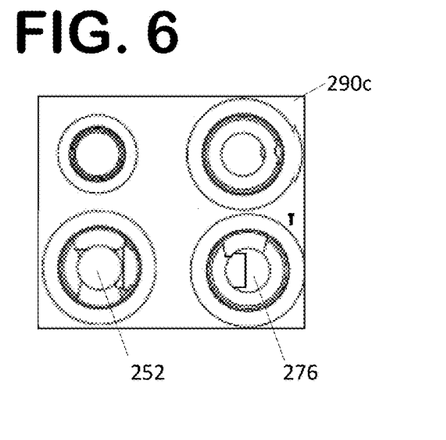
FIG. 6 is a third side view of the hydraulic manifold shown in FIG. 3.
Figure 7:
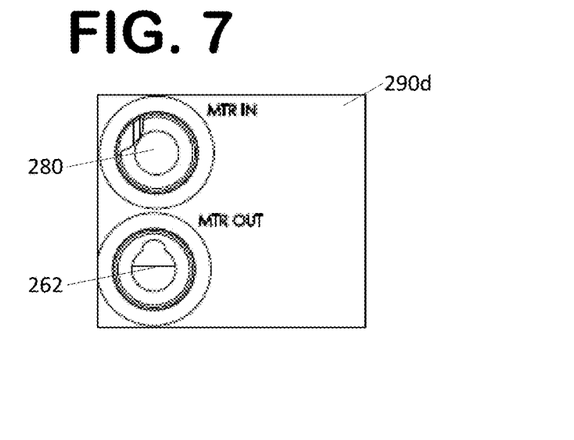
FIG. 7 is a fourth side view of the hydraulic manifold shown in FIG. 3.
Figure 8:
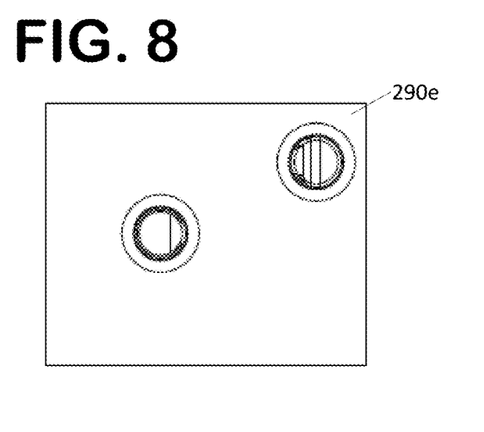
FIG. 8 is a fifth side view of the hydraulic manifold shown in FIG. 3.
Figure 9:
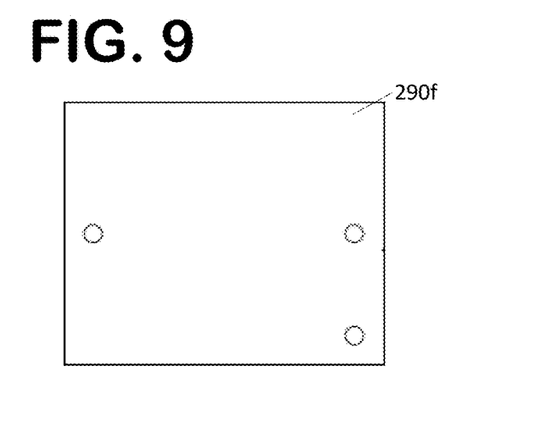
FIG. 9 is a sixth side view of the hydraulic manifold shown in FIG. 3.

Referring to FIGS. 3-9, the manifold block 290 is shown in greater detail. As shown, manifold block 290 has a first side 290a, a second side 290b, a third side 290c, a fourth side 290d, a fifth side 290e, and a sixth side 290f. On the first side 290a, ports for the valves 206, 210, and 212 are provided. On the second side 290b, ports for valve 208, valve 214, and branch line 260 are provided. On the third side 290c, ports for branch lines 252 and 276 are provided. On the fourth side 290d, ports for branch lines 280 and 262 are provided. As configured, the manifold block 290 is adapted to receive and retain the actuators 206a, 208a, 212a, 214a for each respective valve and port. FIG. 3A shows the same manifold block 290, but with a slightly different porting arrangement on the third side 290c.

Figure 2:
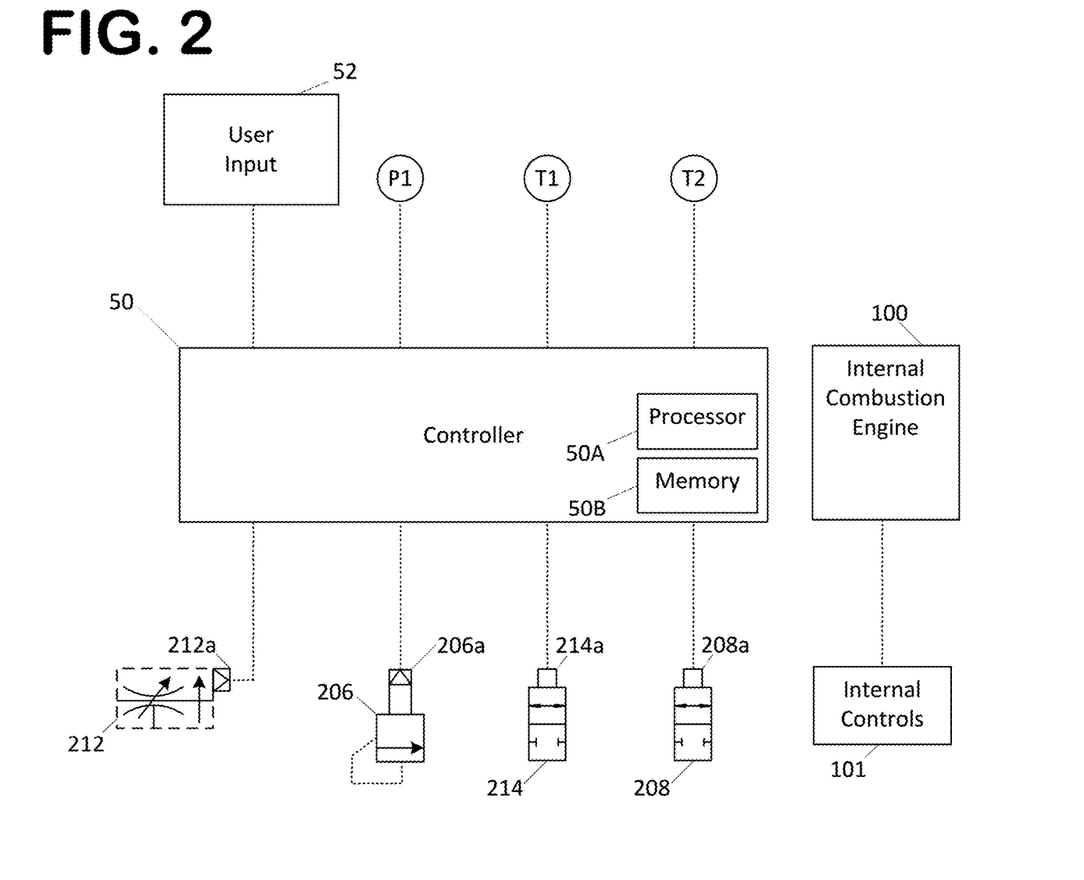
FIG. 2 is a schematic view of a control system usable with the flameless heating system shown in FIG. 1.

Referring to FIG. 2, the flameless heating system 10 may also include an electronic controller 50. The electronic controller 50 is schematically shown as including a processor 50A and a non-transient storage medium or memory 50B, such as RAM, flash drive or a hard drive. Memory 50B is for storing executable code, the operating parameters, and the input from the operator user interface 52 while processor 50A is for executing the code.

The electronic controller 50 typically includes at least some form of memory 50B. Examples of memory 50B include computer readable media. Computer readable media includes any available media that can be accessed by the processor 50A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 50A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Electronic controller 50 is also shown as having a number of inputs and outputs that may be used for implementing the operation of the flameless heating system 10. One of the inputs is the measured leaving airflow temperature provided by the temperature sensor T1. Another input is the measured hydraulic fluid temperature in the storage tank 202 provided by temperature sensor T2. Yet another input is the measured hydraulic fluid pressure upstream of the fourth valve 212 provided by pressure sensor P1. One skilled in the art will understand that many other inputs are possible. For example, measured engine speed may be provide as a direct input into the electronic controller 50 or may be received from another portion of the control system via a control area network (CAN) 101. The measured pump displacement, for example via a displacement feedback sensor, may also be provided. The operator user interface 52, which may be electronic or electric, may also provide inputs into the controller, such as a temperature set point for the hydraulic fluid stored in the storage tank 202.

As configured, the electronic controller 50 provides output commands to the first valve actuator 206a, the second valve actuator 208a, the fourth valve actuator 212a, and the fifth valve actuator 214a. In one embodiment, the valve command output from the controller 50 to each valve is a proportional signal.

The electronic controller 50 may also include a number of maps or algorithms to correlate the inputs and outputs of the controller 50. For example, the controller 50 may include an algorithm to cooperatively control the first valve 206 position and the fourth valve 212 position based on the measured temperature at temperature sensor T1 and/or the desired flow rate for the airflow stream 32. An additional map may be provided to correlate airflow volume with the hydraulic pressure measured at P1 and the commanded valve position for valve 212. In one embodiment, the controller 50 includes an algorithm that provides upper and lower limits for the airflow stream airflow rate, the hydraulic system fluid pressure, and/or the hydraulic system temperature.

Figure 2A:
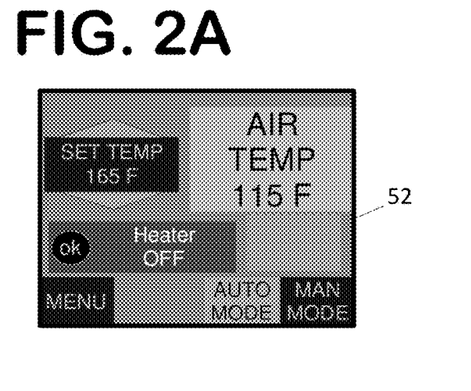
FIG. 2A is a screenshot of a user interface suitable for use with the control system shown FIG. 2 wherein the interface shows an automatic mode of operation.

In one embodiment, the electronic controller has an automatic operation mode and a manual operation mode. In one embodiment, the automatic mode is engaged through the user interface 52, as shown in FIG. 2A. In the automatic operation mode, the controller 50 places the first valve 206 in a maximum pressure drop position, and also places the second and fifth valves 208, 214 in the closed position. The fourth valve 212 is then modulated in a primary control loop to maintain a temperature set point at temperature sensor T1. As shown at FIG. 2A, the temperature set point for T1 can be designated by an operator through a user interface 52 in communication with the controller 50. The automatic mode may also include limits on the position of the fourth valve 212 to ensure that the airflow rate is between an acceptable range of values. For example, the position of the valve 212 can be limited to ensure a minimum air flow rate of 1,000 cfm and a maximum air flow rate of 2,000 cfm. As stated above, the airflow volume can be calculated by using existing inputs and command values in the controller 50. Alternatively, the airflow volume can be directly measured.

Figure 2B:
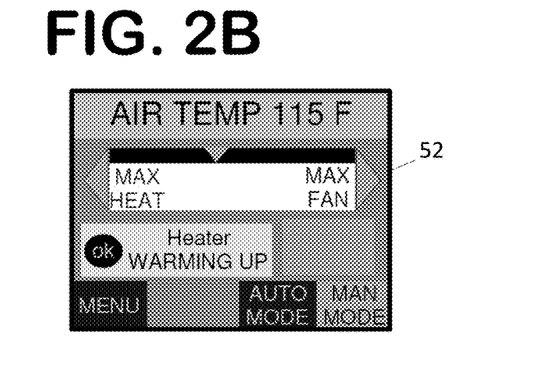
FIG. 2B is a screenshot of a user interface suitable for use with the control system shown FIG. 2 wherein the interface shows a manual mode of operation.

The manual mode allows an operator to optimize the operation of the system in cases where the automatic mode may provide less than desired performance. For example, it may be beneficial to override the system into the manual mode where additional airflow is needed for an application including a long ductwork run. In one embodiment, the manual mode is engaged through the user interface 52, as shown in FIG. 2B, and may be implemented in a number of ways. For example, the controller 50 and the user interface 52 can be configured to allow a user to manually set the position of the fourth valve 212. Referring to FIG. 2B, the user interface 52 allows for the fourth valve 212 to be set anywhere between a "Max Fan" position and a "Max Heat" position. The "Max Fan" position corresponds to the fourth valve 212 being placed in a condition where the maximum allowed hydraulic flow is sent to the hydraulic motor 216 while the remaining hydraulic flow is sent to the first valve 206. Accordingly, this position places the system in a state where the maximum possible airflow is delivered from the system 10. The "Max Heat" position corresponds to the valve 212 being placed in a condition where the maximum allowed flow is sent to the first valve 206 while the remaining flow is sent to the hydraulic motor 216.

In either of the automatic or manual operational modes, the hydraulic fluid temperature T2 can be monitored by the controller 50 to ensure a maximum fluid temperature set point is not exceeded. The maximum fluid temperature set point exists to protect the pump 204 and other hydraulic components in the system 200 from damage caused by excessive fluid temperatures. During operation of the system, it is possible that the fourth valve 212 will have fully moved to a position where maximum fluid is being delivered to the hydraulic motor 216 (i.e. minimum flow to valve 206) and the fluid temperature at sensor T2 is still at or near the maximum fluid temperature set point. When such a condition exists, the controller 50 will begin modulating the first valve 206 to a more open position that will maintain the hydraulic fluid temperature at the maximum fluid temperature set point. Once the fluid temperature has fallen back below the maximum fluid temperature set point, the controller 50 returns the first valve 206 to the maximum pressure drop position and normal operation can resume.

The operation of the internal combustion engine 100 may be controlled through controller 50, through its own electronic controller 101, and/or through an electrical system. In one embodiment, the internal combustion engine 100 is operable at either a low rpm (e.g. 1,800 rpm) setting or a high rpm setting (e.g. 2,500 rpm) that are manually selectable by an operator. In such a configuration, the low rpm setting is generally used for the warm-up and/or cool-down phases of operation while the high rpm setting is utilized for normal heating operations in the manual or automatic modes. In one embodiment, controls for selecting the rpm setting are located on a panel separate from the user interface. In one embodiment, the rpm controls are integrated into controller 50 and the user interface.

During normal operation of the internal combustion engine 100, the pump 204 will impart a torque load on the engine 100. This load is increased as the first valve 206 moves towards the maximum pressure drop position because the resistance in the hydraulic system 200 that the pump 204 must work against is correspondingly increased. The hydraulic motor 216 similarly increases the load on the engine 100. In order to maintain the rpm setting as the torque load on the engine 100 increases, the engine 100 will burn significantly more fuel as compared to an idle condition. As the engine is increasingly loaded and burns more fuel, heating into the plenum 20 is also increased through increased engine radiation, increased heating load at the radiator 108, and increased exhaust output through heat exchanger 120. In one embodiment, the engine 100, the first valve 206, and the hydraulic motor 216 are optimally selected such that the torque load and fuel consumption on the engine will be maximized during normal operation. Such a selection will result in a system 10 that produces a maximum heating output for the size of the engine.

Examples

In one example of an optimized system, the flameless heating system 10 can be configured to heat an ambient airflow stream 32a from 0 degrees F. to 180 degrees F. at a volumetric flow rate of 1,200 cubic feet per minute. These conditions correspond to an overall heating output for the flameless heating system 10 of about 200,000 BTH/hour.

To achieve this output, a 1.5 liter diesel engine consuming about 1.8 gallons of fuel per hour is selected. In this state, the engine 100 is providing approximately 25 horsepower at a rotational speed of about 2,500 rpm while radiating about 18,000 BTU/hour into the plenum 20. Additionally, the radiator 108 will add approximately 64,000 BTU/hour to the plenum 20 under these conditions wherein the entering coolant temperature is about 180 degrees F., the leaving coolant is about 170 degrees F., and the coolant flow rate is about 14 gpm. Finally, the engine exhaust heat exchanger 120 will add approximately 26,000 BTU/hour wherein the entering exhaust temperature is about 800 degrees F. and the leaving temperature is about 500 degrees F.

Additionally, a pump 204 is selected that can provide about 28 gallons per minute (gpm) of flow at a pressure of about 1,500 psi, wherein approximately 5 gpm is delivered to the hydraulic motor 216 and approximately 23 gpm of 200 degree F. fluid is delivered to the heat exchanger 220. In this state, heat exchanger 220 delivers about 92,000 BTU/hour into plenum 20 with a fluid temperature drop of about 20 degrees through the exchanger 220.

It is noted that the radiator 108 is located upstream of the heat exchanger 220 and the exhaust heat exchanger 120 because the radiator 108 is operating at the lowest temperature of the three exchangers. Likewise, the exhaust heat exchanger 120 is located at the most downstream position due to this exchanger having the highest temperatures. As the hydraulic heat exchanger 220 has an intermediate temperature, the exchanger 220 is located between the radiator 108 and exhaust heat exchanger 120. By arranging the heat exchangers 108, 220, and 120 in this manner, the heating output of the system 10 can be maximized.

When burning standard diesel fuel for the above described example, the total fuel consumption for the flameless heating system 10 is approximately 260,000 BTU/hour. As the heating system provides about 200,000 BTU/hour of usable heat via heated airflow stream 32b, the total system efficiency is about 77%. This performance is significantly higher than many other types of flameless heating systems known in the art.

Table 1 below provides a design and performance summary of four differently sized flameless heating systems 10 in accordance with the concepts disclosed herein.

TABLE 1

| Platform | Engine HP | Engine RPM's | Liter | Engine Fuel Rate (GPH) | PSI | System Hydraulic Flow (GPM) | Max CFM's | BTU/hr Output |
| --- | --- | --- | --- | --- | --- | --- | --- | --- |
| Mule | 25 | 2600 | 1.5 | 1.8 | 1500 | 28 | 1500 | 200,000 |
| Small | 43 | 2600 | 2.2 | 2.5 | 1600 | 30 | 4000 | 280,000 |
| Medium | 73 | 2500 | 3.0 | 3.6 | 2500 | 40 | 5000 | 410,000 |
| Large | 113 | 2200 | 3.0 | 5.1 | 2800 | 58 | 6000 | 570,000 |

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method of controlling a mobile heating system, the mobile heating system comprising an enclosure supported by a mobile chassis having at least a pair of wheels and a hitch such that the mobile heating system can be towed by a vehicle, the enclosure defining an air flow path having an air inlet and an air outlet, the method comprising:
   generating heat with a first heat source located within the enclosure air flow path and between the air inlet and the air outlet, the first heat source being an internal combustion engine;
   generating heat with a second heat source located within the enclosure air flow path and between the air inlet and the first heat source, the second heat source being a radiator associated with the internal combustion engine;
   generating heat with a third heat source located within the enclosure air flow path and between the air inlet and air outlet, the third heat source being configured to receive exhaust from the internal combustion engine;
   generating heat with a fourth heat source located within the enclosure air flow path and between the first heat source and the air outlet;

electronically controlling a temperature output of the fourth heat source; and operating a fan coupled to a hydraulic motor to transport an air flow stream from the enclosure air flow path inlet, through the first, second, third, and fourth heat sources, and out of the enclosure air flow path outlet.

2. The method of claim 1, wherein the fourth heat source is configured to deliver heat to the air flow path via oil heated by a hydraulic circuit powered by the internal combustion engine, wherein the hydraulic circuit includes a hydraulic pump, a hydraulic motor, and first and second valves, wherein the second valve is upstream of the first valve.

3. The method of claim 2, further comprising electronically operating a first valve of the fourth heat source to cause a temperature of the oil to change.

4. The method of claim 3, further comprising electronically operating a second valve to adjust the flow of the hydraulic fluid to the hydraulic motor.

5. The method of claim 1, further comprising:
receiving an indication of a temperature of the air flow stream;
receiving a temperature set point of the air flow stream; and
maintaining the temperature set point by controlling the operation of at least one of:
a hydraulic circuit of the fourth heat source; and
the fan.

6. The method of claim 5, wherein the indication of the temperature of the air flow stream is provided by a temperature sensor, wherein the temperature sensor is provided downstream of the fan and adjacent the air outlet.

7. The method of claim 5, further comprising receiving an indication of a hydraulic fluid temperature in a storage tank provided by a temperature sensor.

8. The method of claim 5, further comprising receiving an indication of a hydraulic fluid pressure of the hydraulic circuit.

9. The method of claim 1, further comprising receiving an air flow rate set point of the air flow stream and maintaining the air flow rate set point by controlling the operation of a hydraulic circuit in communication with the fourth heat source and the fan.

10. A method of controlling a mobile heating system, the mobile heating system comprising an enclosure supported by a mobile chassis having at least a pair of wheels and a hitch such that the mobile heating system can be towed by a vehicle, the enclosure defining an air flow path having an air inlet and an air outlet, the method comprising:

generating heat with a first heat source located within the enclosure air flow path and between the air inlet and the air outlet, the first heat source being an internal combustion engine;

generating heat with a second heat source located within the enclosure air flow path and between the air inlet and the first heat source, the second heat source being a radiator associated with the internal combustion engine;

generating heat with a third heat source located within the enclosure air flow path and between the air inlet and the air outlet, the third heat source being configured to receive exhaust from the internal combustion engine;

generating heat with a fourth heat source located within the enclosure air flow path and between the first heat source and the air outlet, the fourth heat source being configured to deliver heat to the air flow path via oil heated by a hydraulic circuit powered by the internal combustion engine, wherein the hydraulic circuit includes a hydraulic pump, a hydraulic motor, and first and second valves, wherein the second valve is upstream of the first valve;

electronically operating a first valve of the fourth heat source to cause a temperature of the oil to change;

electronically operating a second valve to adjust the flow of the hydraulic fluid to the hydraulic motor;

providing a fan coupled to the hydraulic motor; and operating the fan to transport an air flow stream from the enclosure air flow path inlet, through the first, second, third, and fourth heat sources, and out of the enclosure air flow path outlet.

11. The method of claim 10, wherein the first valve is operated to increase a fluid pumping pressure of the hydraulic pump.

12. The method of claim 10, further comprising:
receiving an indication of a temperature of the air flow stream;
receiving a temperature set point of the air flow stream; and
maintaining the temperature set point by controlling the hydraulic circuit.

13. The method of claim 12, wherein the indication of the temperature of the air flow stream is provided by a temperature sensor, wherein the temperature sensor is provided downstream of the fan and adjacent the air outlet.

14. The method of claim 10, further comprising receiving an air flow rate set point of the air flow stream and maintaining the air flow rate set point by controlling the operation of the hydraulic circuit.

* * * * *